Feb. 18, 1964   J. T. PAYNE   3,121,338
CONTROL APPARATUS

Filed Sept. 13, 1961   3 Sheets-Sheet 1

INVENTOR.
JAMES T. PAYNE
BY Roy E. Raney
ATTORNEY

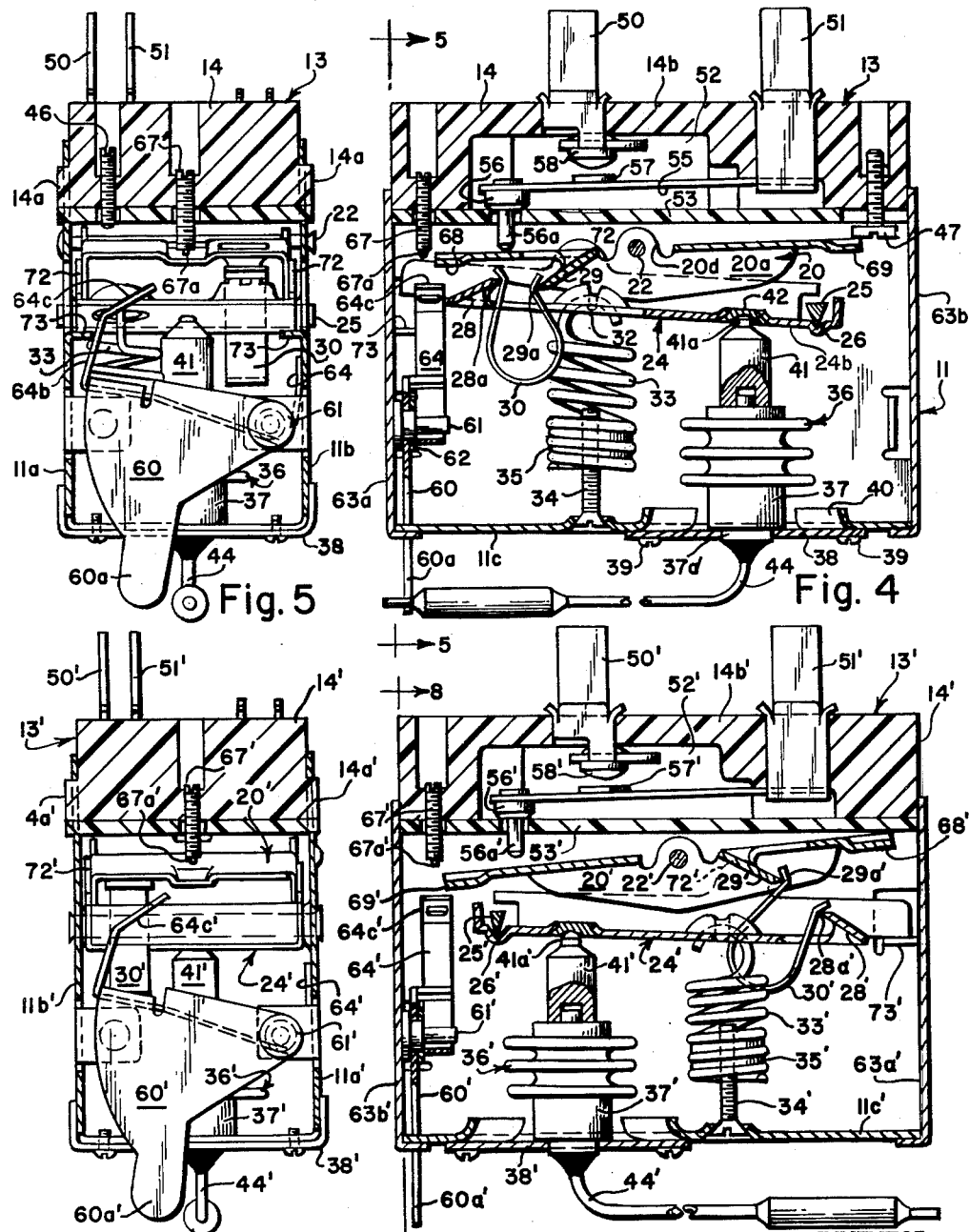

Feb. 18, 1964   J. T. PAYNE   3,121,338
CONTROL APPARATUS
Filed Sept. 13, 1961   3 Sheets-Sheet 3
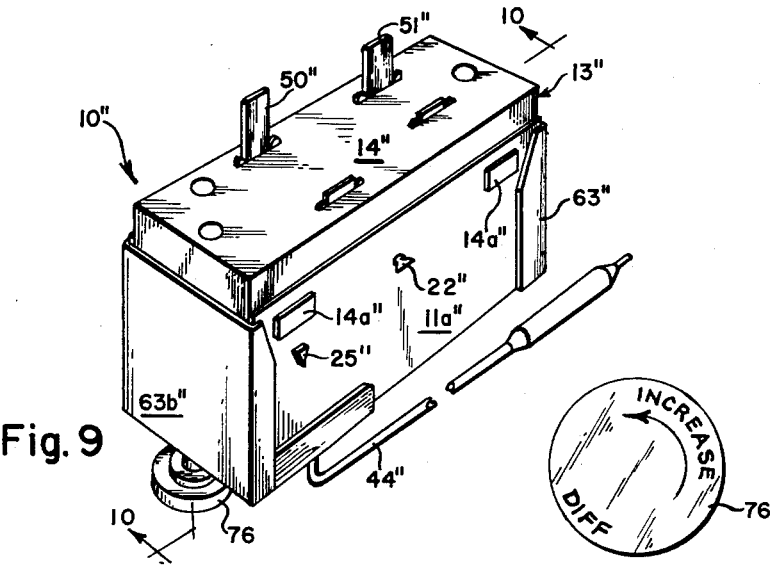
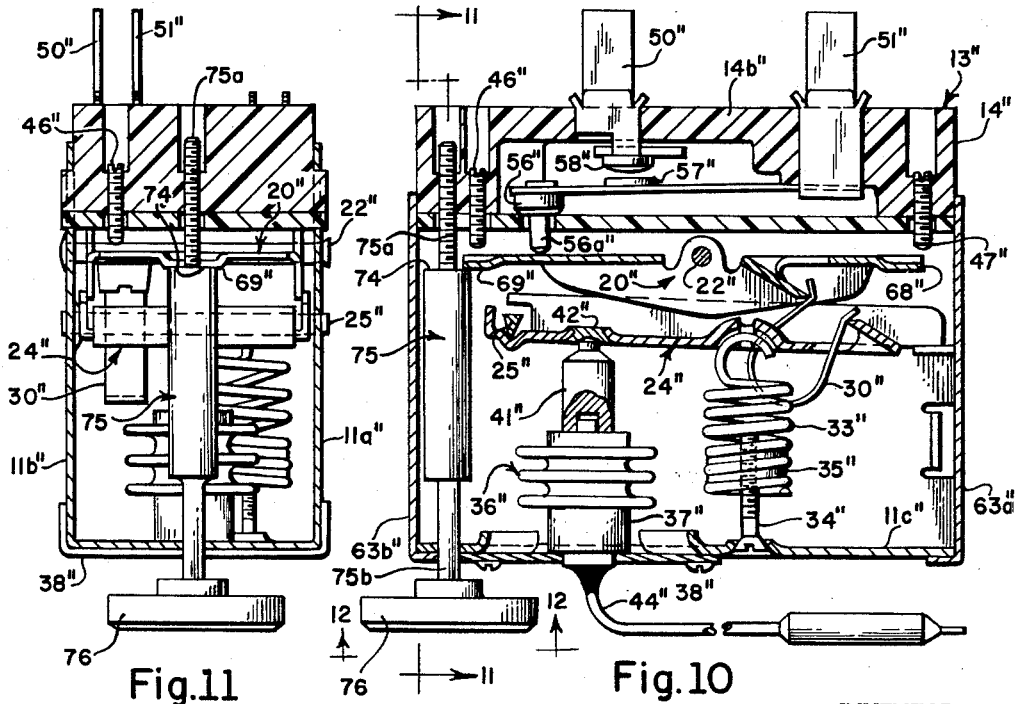
INVENTOR.
JAMES T. PAYNE
BY
ATTORNEY United States Patent Office 3,121,338
Patented Feb. 18, 1964

3,121,338
CONTROL APPARATUS
James T. Payne, Fort Lauderdale, Fla., assignor to Ranco Incorporated, Columbus, Ohio, a corporation of Ohio
Filed Sept. 13, 1961, Ser. No. 137,895
9 Claims. (Cl. 74—2)

This invention relates to improvements in pressure responsive control apparatus of the type suitable for controlling electrically powered equipment such as electric motor driven refrigerator systems in accordance with pressure or temperature changes therein. More particularly, the invention is directed to improvements in control apparatus of that type in which a pressure responsive element actuates a control device, such as an electric switch, through the medium of a snap acting mechanism which is caused to operate the switch upon movements of the pressure responsive element in accordance with changes in pressure therein.

A principal object of the invention is the provision of a control apparatus of the above mentioned character in which the control device or electric switch comprises one sub-assembly while the expansible element and snap acting mechanism comprise another sub-assembly, the sub-assemblies being so constructed that when they are joined in one manner they form a control apparatus which is adapted to provide a switching function, such as opening of contacts to "cut-out" the apparatus controlled, upon a pressure increase to a predetermined high pressure, while joining of the sub-assemblies in a different manner will provide the same switching function upon a decrease in pressure to a predetermined low pressure.

Another object of this invention is the provision of a control apparatus, made up principally of stock sub-assemblies of the type described in the preceding paragraph, and comprising an indicator member having a portion which becomes exposed through the switch housing upon happening of the switching function so as to provide a visual indication thereof, and which indicator may serve also as a push button for manually resetting the control apparatus after the pressure condition which caused the actuation thereof has been removed.

Still another object of this invention is the provision of control apparatus which may be assembled from stock parts in various ways to provide various responses and in which the apparatus may be accurately and conveniently adjusted to increase or decrease the pressures at which the apparatus is actuated, and to vary the differential between "cut-in" and "cut-out" pressures.

The invention may be further said to reside in certain constructions and arrangements of parts by which the foregoing objects and advantages are accomplished as well as others as will be readily understood from the following detailed description of presently preferred embodiments of the invention read in conjunction with the accompanying sheets of drawings forming a part of this specification, and in which:

FIG. 4 is a view similar to FIG. 2 but showing parts in different operative positions;

FIG. 5 is a sectional view taken substantially along line 5—5 of FIG. 4;

FIG. 7 is an enlarged sectional view of the apparatus of FIG. 6 taken substantially along line 7—7 thereof;

FIG. 8 is a sectional view taken substantially along line 8—8 of FIG. 7;

FIG. 9 is a perspective view of still another form of control apparatus embodying the invention;

FIG. 10 is an enlarged sectional view taken substantially along line 10—10 of FIG. 9;

FIG. 11 is a sectional view taken along line 11—11 of FIG. 10; and

FIG. 12 is a fragmentary view of the control knob of the apparatus of FIG. 10 taken along line 12—12 thereof.

Figures 1, 6:
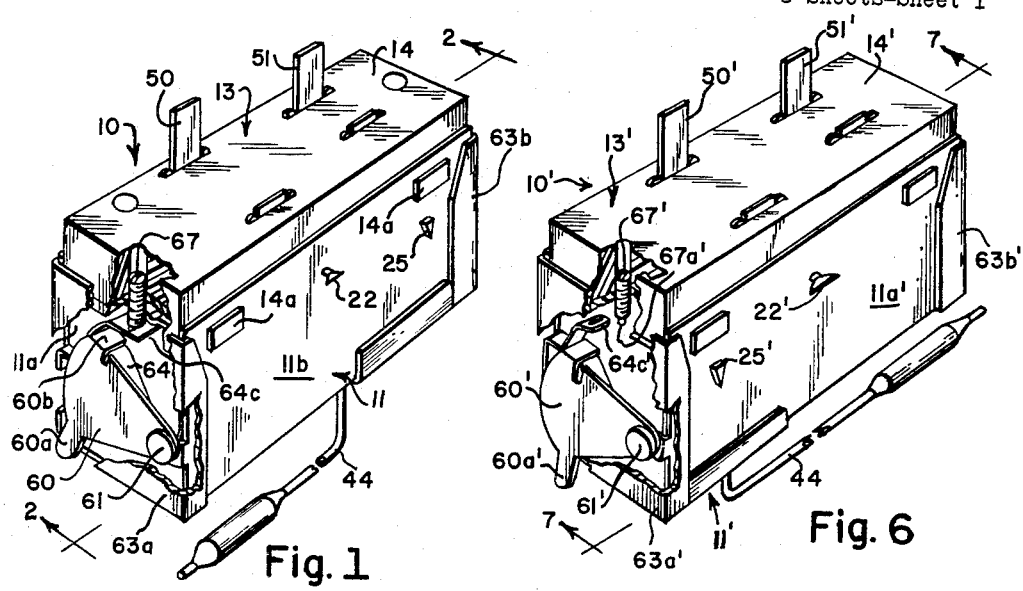
FIG. 1 is a perspective view of a control apparatus embodying the invention, with a portion of the casing broken away.
FIG. 6 is a perspective view of another form of control apparatus embodying the invention, with a portion broken away.

The present invention is particularly suited to embodiment in control apparatuses of the type comprising electric switch means for closing or "cutting-in" an electric circuit, of an electrically driven mechanical refrigeration system for example, and for opening or "cutting-out" the circuit in response to pressure changes experienced within an expansible member forming part of the control apparatus and which may be connected so as to be acted upon by pressures within the refrigeration system or by vapor pressures of a fluid within a bulb subjected to the temperature of the area to be tempered, as is well understood in the art.

Referring to FIGS. 1 through 4, there is shown a control apparatus, generally indicated at 10, comprising a channel shaped sheet metal frame 11 having parallel extending side walls 11a and 11b joined by an end wall 11c. A control device in the form of an electric switch, generally indicated at 13 and including a rectangular casing 14, is mounted between the end portions of side walls 11a and 11b so as to close the side of frame 11 opposite end wall 11c. Casing 14 is conveniently retained in place by lugs 14a extending therefrom through openings in walls 11a, 11b. Switch 13, which will later be described in more detail, is arranged to be actuated by a snap acting mechanism supported within frame 11. This mechanism, best illustrated in FIG. 2, comprises a first lever 20 which is formed as a channel shaped, sheet metal stamping comprising two parallel side ribs 20a joined by spaced webs 20b and 20c. A pair of apertured bearing portions 20d extend from side ribs 20a between the webs and receive a pivot pin 22 extending through frame walls 11a and 11b and serving to pivotally mount lever 20 at or near the center thereof. Lever 20 may be rotated about pin 22 to move either end thereof toward and away from switch 13.

A second, channel shaped, sheet metal lever 24 extends between lever 20 and frame end wall 11c. Lever 24 has two parallel extending side ribs 24a joined by a web 24b, and is pivoted at one end to side walls 11a and 11b by a triangular pivot pin 25 having one edge engaged in a groove 26 formed in web 24b. Near the movable end of lever 24 a portion of the web 24b is struck out to form a bearing member 28 extending toward lever 20. A portion of web 20b of lever 20 is formed to provide a bearing member 29 extending toward lever 24. Bearing members 28 and 29 have sharp edges 28a and 29a, respectively, between which is disposed a U-shaped compression spring 30, the ends of which are each bent to a V-shape to provide pivotal engagement with the bearing member edges 28a and 29a. Spring 30 acts to bias levers 20 and 24 in opposite directions about their respective pivots so that when lever 24 is moved in one direction to bring edge 28a through a dead center position on a line extending through edge 29a and pivot pin 22, spring 30 will act to move lever 20 in the opposite direction with a snap movement. This snap movement is utilized to actuate switch 13 in a manner which will become apparent as the description proceeds.

The central portion of web 24b of lever 24 has an eye 32 struck out therefrom for engagement by a hook 33a formed at one end of a tension spring 33. Tension spring 33 is connected at its other end to frame end wall 11c by an adjusting screw 34 which is threadedly engaged in a nut member 35 lodged between the end turns of spring 33. Lever 24 is adapted to be moved against the resistance of spring 33 by pressure responsive power means in the form of an expansible bellows element 36.

Bellows element 36 has a base 37 having a reduced neck portion 37a extending through a mounting plate 38 secured by screws 39 to frame wall 11c with the bellows 36 extending through an opening 40 formed in the frame wall. Bellows 36 has an axially movable post 41 mounted thereon which is provided with a spherical tip 41a engaged in a socket 42 mounted in lever 24. A capillary tube 44 is connected to base 37 as by brazing and communicates with the interior of bellows 36. Tube 44 is adapted to be connected to the high pressure side of a refrigeration compressor, for example, so that bellows 36 will expand and contract in accordance with pressure changes experienced in the high side of the refrigeration system. It will be recognized that adjustment of screw 34 will increase or decrease the tension of spring 33 to change the loading force on bellows 36 and hence the range of pressures to which the bellows will be responsive. Screw 34 may therefore be referred to as a range screw, and it is normally adjusted at the time of manufacture of the control apparatus in accordance with the service to which the apparatus will be put.

Figures 2, 3:
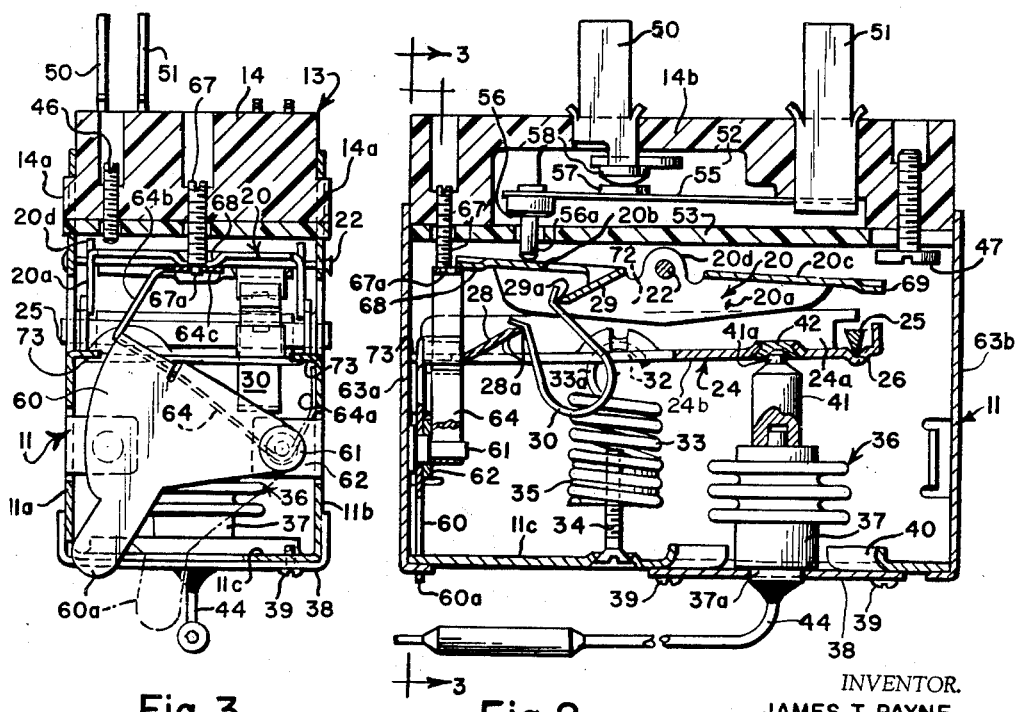
FIG. 2 is an enlarged sectional view of the apparatus of FIG. 1 taken substantially along line 2—2 thereof.
FIG. 3 is a sectional view taken substantially along line 3—3 of FIG. 2.

Movement of lever 20 in a clockwise direction, as viewed in FIG. 2, under the snap acting influence of spring 30 is limited by engagement of the left hand end of lever 20 with an adjustable stop screw 46 extending from switch casing 14, while counter-clockwise movement of lever 20 is limited by engagement of the right hand end thereof with an adjustable stop screw 47 which is threadedly engaged in switch casing 14.

The snap acting movement of centrally pivoted lever 20 is utilized to operate switch 13 which comprises a pair of terminal members 50 and 51 which extend through, and are secured in, openings in a wall 14b of switch casing 14 which is formed of a suitable molded insulating material such as "Bakelite." Terminal members 50 and 51 extend into an interior cavity 52 formed in casing 14 and defined in part by a cover 53 which is formed of a suitable insulating board.

A leaf spring 55 has one end anchored to the inner end of terminal member 51, and carries at its other end a switch actuating member 56 which is formed of an insulating material such as "Nylon" and has a portion 56a extending through an opening in cover 53. A movable contact 57 is carried on the medial portion of leaf spring 55 and is movable toward and away from a fixed contact 58 mounted on the inner end of terminal member 50. The inherent spring action of leaf spring 55 normally tends to move contact 57 away from contact 58. However, actuator member 56 is adapted to be engaged by web 20b of lever 20 when the latter is in its FIG. 2 position, thereby causing spring 55 to bring contact 57 into engagement with fixed contact 58.

In the event that pressure in the part of the refrigeration system to which tube 44 is connected exceeds a predetermined maximum pressure, determined by range screw 34 and stop screw 46, lever 24 will be moved by bellows 36 to bring bearing edge 28a through its dead center position so as to cause spring 30 to snap lever 20 in a counter-clockwise direction into the position illustrated in FIG. 4. This movement of lever 20 permits leaf spring 55 to open contacts 57 and 58 to "cut-out" or deenergize the electric motor operating the compressor of the refrigeration system.

Means are provided for visually indicating the cutting-out actuation of the control apparatus, and comprise an indicating member 60 which is formed from sheet metal and is pivoted by a headed pivot pin 61 to an inturned lug 62 formed on the edge of frame wall 11b. Pin 61 is retained by a removable frame cover member 63a which overlies the head of the pin and serves to keep dust and the like from the interior of the control apparatus. A similar cover 63b is provided at the opposite end of the apparatus.

Indicator member 60 has a tab shaped flag 60a projecting below frame end wall 11c and adapted to be moved to the dotted line position shown in FIG. 3 upon actuation of the control apparatus. A leaf spring 64 is secured at the middle portion thereof to a tab 60b of indicator member 60 by soldering and has one portion 64a leading around pin 61 with the terminal portion bearing against frame wall 11b. Spring 64 tends to bias indicator member 60 to its dotted line position of FIG. 3; however, spring 64 has a portion 64b extending from indicator member 60 toward switch 13 and terminating in an apertured end portion 64c which engages a projection 67a formed on a screw 67 extending from switch casing 14. Screw 67 is adjusted so that when spring 64 is engaged thereby, end portion 64c of this spring overlies a projection 68 formed in the end of lever 20.

When lever 20 is actuated to its FIG. 4 position to open the switch, projection 68 at the end of the lever moves spring end 64c out of engagement with screw projection 67a, thereby releasing indicator member for movement by spring 64 to its indicating position. Flag 60a may be painted a suitable color, such as red, to serve as a warning that the predetermined pressure has been exceeded.

When the excessive pressure condition which caused actuation of the control apparatus is removed, bellows 36 will contract, allowing lever 24 to be moved by spring 33 to bring spring 30 through its dead center position so as to snap lever 20 once again to its switch closing, FIG. 2 position. The pressure at which this will occur may be selected by adjustment of stop screw 47. The difference between the pressure at which lever 20 will be snapped to open the switch and the pressure at which it will be snapped to close the switch is referred to as the pressure differential. After the lever 20 moves to its switch closing position, the flag 60a may be depressed to cause spring end 64c to engage screw projection 67a thereby fully restoring the control apparatus to readiness for cutting-out the refrigeration system in the event of another increase in pressure above the predetermined high pressure.

It is often desirable to have a control apparatus similar to that just described but wherein the "cutting-out" or opening action of the switch thereof occurs upon a decrease in pressure below a predetermined minimum allowable pressure such as may happen at times on the low pressure or suction side of a refrigeration compressor. The present invention contemplates the provision of such a control apparatus by utilizing the same components used in the control apparatus 10 described above.

Thus, by considering the control device or switch 13 as one sub-assembly and the frame and snap acting mechanism therein as another sub-assembly, and then by turning the latter sub-assembly 180° with respect to the former before uniting them there will be provided a control apparatus, illustrated in FIGS. 6, 7 and 8, which will function to cut-out at a predetermined low pressure. In the control apparatus of these figures, the parts corresponding to parts of control apparatus 10 have corresponding reference numerals with the addition of a prime mark.

In addition to reversing the relation of switch 13' to frame 11', indicator member 60' and its associated pivot pin 61' and spring 64', have been moved to the other end of the frame for cooperation with projection 69' on lever 20' so as to be effective in indicating cutting-out actuation of the control. In this apparatus 10' then, indicator pivot pin 61' is retained by cover member 63b'.

While the control apparatus 10 was described as automatically "cutting-in" upon removal of the excessive pressure condition which would cause it to "cut-out," it is sometimes desirable to require manual actuation of the apparatus to effect the cutting-in function. Apparatus 10' is an example of a control apparatus requiring manual resetting to effect the cutting in function thereof. This is accomplished, as may best be seen by comparison of FIGS. 4 and 7, by omitting from apparatus 10' the stop screw which would correspond to stop screw 47. This permits lever 20' to be moved by spring 30' to the position illustrated in FIG. 7, that is, with the right hand end of the lever engaging switch casing cover 53'.

Thereafter, upon removal of the abnormally low pressure which caused cutting-out of the control apparatus 10', bellows element 36' will expand moving lever 24' toward lever 20'. This movement, however, will be limited by engagement of stop projections 72' against cover 53' before bearing edge 28a' reaches an over center position with respect to edge 29a' and pivot 22', thereby preventing automatic snap action of lever 20' in a counter-clockwise direction to close switch 13. Manual depression of indicator member 60', after the abnormal low pressure condition has been removed, will bring spring end 64c' against projection 69' of lever 20' forcing the latter in a counter-clockwise direction a sufficient amount to permit spring 30' to snap the lever to a position closing contacts 57' and 58'. If the indicator member 60' is depressed before the abnormally low pressure condition is removed, the position of lever 24' and spring 30' when the predetermined minimum low pressure still exists causes spring 30' to have a biasing effect on lever 20' which cannot be overcome by the action of spring 64' on projetcion 69'. It is therefore impossible to manually hold the switch contacts 57', 58' in a closed condition when the pressure has fallen below the predetermined minimum low pressure.

It will be understood, of course, that the control apparatus 10 of FIGS. 1 through 5 may be modified to prevent automatic resetting or closing of the contacts 57, 58 upon removal of the abnormal high pressure condition, by removal of stop screw 47 which will permit lever 20 to rotate in a counter-clockwise direction to a position beyond that from which the lever 20 may be snapped to its switch closing position by movement of lever 24. Movement of lever 24 away from lever 20, in such a case, is limited by inwardly directed projections 73 formed from side walls 11a and 11b and adapted to be engaged by the movable end of that lever.

In some applications it is desired to have a control apparatus in which the pressure or temperature differential, that is the difference between the cut-in and cut-out temperatures or pressures, may be varied by an external control means. Such an apparatus, indicated generally at 10", is illustrated in FIGS. 9 through 12, and is constructed basically of the same subassemblies and components as are the previously described controls 10 and 10'. In control 10", which is actuated to an open switch position upon a decrease in pressure below a predetermined minimum pressure, the counter-clockwise rotation of lever 20" as viewed in FIG. 10 is limited by engagement of the end of the lever with a shoulder 74 formed on a differential adjusting screw 75. Screw 75 has a threaded portion 75a engaged in a threaded opening in switch casing 14" and has an elongated shank 75b extending through an opening in frame end wall 11c". A pressure differential selecting knob 76 is secured to the outer end of screw shank 75b and serves to permit external adjustment of the limitation of counter-clockwise movement of lever 20", and hence adjustment of the spread or differential between the pressures at which the contact of switch 13" are opened or closed.

While control apparatus 10" is illustrated as being of the automatic resetting type having no indicator member, and as being the low pressure action type, it will be understood that the switch sub-assembly 13" may be reversed with respect to the casing 11" to provide a high pressure switch actuation, and that one or the other of limiting screws 46 or 47 may be omitted to prevent automatic resetting, and also that an indicating member such as member 60 of apparatus 10 may be included to provide indication of switch actuation and means for manual resetting.

From the foregoing detailed description of a number of control apparatuses embodying the present invention, it will be recognized that there has been provided by the invention particularly versatile control apparatus constructions which permit the utilization of a small number of standard components to provide a great variety of control apparatuses having different operating characteristics. By the utilization of the components in the manners described above, no less than fourteen different combinations of high and low pressure switches, manual or automatic resetting, external differential adjustment, and indicating means may be provided from "off the shelf" components. Of course, other control devices than the switch 13 may be used, such as those including double throw contacts, pneumatic control valve means, and the like, the switch 13 being exemplary only.

Although the invention has been described with specific reference to various control apparatuses as preferred embodiments of the invention, it will be understood that the invention is not limited thereto, but rather the invention includes all those changes, modifications, adaptations and uses as are reasonably embraced by the scope of the claims hereof.

Having thus disclosed my invention, I claim:

1. Control apparatus comprising a frame, a snap acting mechanism within said frame and including a centrally pivoted lever, pressure responsive means in said frame and operative on said mechanism to snap move said lever to alternatively shift the ends thereof in opposite directions, a control device having an actuator member extending therefrom for engagement by one end of said lever for actuating said control device, and means to selectively attach said control device to said frame with said actuator member in alignment with one end or the other of said lever for operation thereby.

2. Control apparatus comprising a frame, a control device mounted on said frame in a first position with respect thereto, a snap acting mechanism within said frame and including a centrally pivoted lever, pressure responsive means in said frame and operative on said mechanism to snap move the ends of said lever alternatively toward and away from said control device in accordance with increases and decreases in pressure, and actuator means extending from said control device and cooperating with one end of said lever to cause said control device to perform a control function upon pressure increase to a predetermined high pressure, said control device being shiftable to a second position with respect to said frame, the other end of said lever cooperating with said actuator means to cause said control device to perform said control function upon a pressure decrease to a predetermined low pressure when said control device is in said second position.

3. Control apparatus as defined in claim 2 and comprising adjustable stop means for limiting movement of said lever, whereby the differential may be varied between the pressure at which said mechanism snap moves the lever in one direction and the pressure at which the mechanism moves the lever in the opposite direction.

4. Control apparatus comprising a frame, a control device mounted on said frame in a first position with respect thereto, a snap acting mechanism within said frame and including a centrally pivoted lever, pressure responsive means in said frame and operative on said mechanism to snap move the ends of said lever alternatively toward and away from said control device in accordance with increases and decreases in pressure, actuator means extending from said control device and cooperating with one end of said lever to cause said control device to perform a control function upon pressure increase to a predetermined high pressure, said control device being shiftable to a second position with respect to said frame, the other end of said lever cooperating with said actuator means to cause said control device to perform said control function upon a pressure decrease to a predetermined low pressure when said control device is in said second position, an indicator member pivotally mounted on said frame for movement between normal and signal positions, spring means acting between said member and said frame and biasing said member toward said signal position, and latch means for releasably restraining said member in said normal position, said lever being operable to release said latch means upon movement of said lever to cause performance of said control function.

5. Control apparatus as defined in claim 4 and comprising adjustable stop means for limiting movement of said lever, whereby the differential may be varied between the pressure at which said mechanism snap moves the lever in one direction and the pressure at which the mechanism moves the lever in the opposite direction.

6. A control apparatus of the character described comprising a channel shaped sheet metal frame having side walls joined by an end wall, a control device supported in a first position between the ends of the side walls and opposite said end wall, a first lever mounted between said side walls and pivoted at its center for movement of opposite ends thereof toward and away from said control device, a second lever mounted between said first lever and said end wall, said second lever being pivoted at one end thereof and having its other end movable toward and away from one end of said first lever, said first lever having a bearing portion extending from said one end thereof toward said second lever, said second lever having a bearing portion extending from said movable end thereof toward said first lever, a compression spring mounted between said bearing portions for biasing said levers about their respective pivots in opposite directions, a pressure responsive expansible element mounted on said end wall of the frame and having connecting means engaging said second lever, loading means biasing said second lever toward said expansible element, said expansible element being operative to move said second lever to bring the bearing portion thereof and said spring through dead center positions with respect to the bearing portion and pivot of said first lever so as to cause snap acting movement of said first lever about its pivot, and actuator means extending from said control device for cooperation with one end of said first lever upon snap movement thereof to actuate said control device, said control device being shiftable to a second position between said side walls so that said actuator means cooperates with the other end of said first lever upon snap movement thereof to actuate said control device.

7. Control apparatus as defined in claim 6 and comprising adjustable stop means for limiting movement of said first lever, whereby the differential may be varied between the pressure at which said first lever is snap moved in one direction and the pressure at which the first lever is snap moved in the other direction.

8. A control apparatus of the character described comprising a frame including a channel shaped sheet metal member having side walls joined by an end wall, a control device supported in a first position between the ends of the side walls and opposite said end wall, a first lever mounted between said side walls and pivoted at its center for movement of opposite ends thereof toward and away from said control device, a second lever mounted between said first lever and said end wall, said second lever being pivoted at one end thereof and having its other end movable toward and away from one end of said first lever, said first lever having a bearing portion extending from said one end thereof toward said second lever, said second lever having a bearing portion extending from said movable end thereof toward said first lever, a compression spring mounted between said bearing portions for biasing said levers about their respective pivots in opposite directions, a pressure responsive expansible element mounted on said end wall of the frame and having connecting means engaging said second lever, loading means biasing said second lever into following engagement with said expansible element, said expansible element being operative to move said second lever in one direction and said loading means being operative to move said second lever in the opposite direction to bring the bearing portion thereof and said spring through dead center positions with respect to the bearing portion and pivot of said first lever so as to cause snap acting movement of said first lever about its pivot, actuator means extending from said control device for cooperation with one end of said first lever upon snap movement thereof to actuate said control device to perform a first control function, stop means for limiting said movement of said second lever by said expansible element so as to prevent actuation thereby of said control device to perform a second control function, a reset member pivoted on said frame and operable to move said second lever in said one direction to cause return snap acting movement of said first lever about its pivot to actuate said control device to perform said second control function, said control device being shiftable to a second position between said side walls so that said actuator means cooperates with the other end of said first lever upon snap movement thereof to actuate said control device.

9. A control apparatus as defined in claim 8 comprising biasing means resiliently resisting operation of said reset member to move said second lever, and latch means for holding said reset member in a predetermined position upon actuation of said control apparatus to perform said second control function, said latch means comprising a projection on said frame and a resilient member connected to said reset member and having an aperture whereby said resilient member is engageable on said projection, and said resilient member being displaceable from said projection by said first lever upon actuation of said apparatus to perform said first control function, whereby said biasing means is operative to move said reset member to a second predetermined position ready to be operated for actuation of said apparatus to perform said second control function.

References Cited in the file of this patent

UNITED STATES PATENTS

| | | |
|---|---|---|
| 2,201,498 | Ninnelet | May 21, 1940 |
| 2,236,680 | Fry | Apr. 26, 1941 |
| 2,405,014 | Caparone | July 30, 1946 |
| 2,468,673 | Kaminky | Apr. 26, 1949 |
| 2,521,469 | Marks | Sept. 5, 1950 |